United States Patent [19]
Miyake

[11] Patent Number: 5,546,424
[45] Date of Patent: Aug. 13, 1996

[54] SPREAD SPECTRUM COMMUNICATION SYSTEM

[75] Inventor: Masayasu Miyake, Tokyo, Japan

[73] Assignee: Casio Computer Co., Ltd., Tokyo, Japan

[21] Appl. No.: 266,235

[22] Filed: Jun. 27, 1994

[30]    Foreign Application Priority Data

Jun. 30, 1993 [JP] Japan ................... 5-160741

[51] Int. Cl.⁶ .................... H04B 1/707; H04B 1/69
[52] U.S. Cl. .................... 375/206; 375/200; 380/34
[58] Field of Search ............ 375/1, 200–210; 380/34; 370/18

[56]          References Cited

U.S. PATENT DOCUMENTS

| | | | |
|---|---|---|---|
| 3,808,536 | 4/1974 | Reynolds | 375/1 X |
| 4,308,617 | 12/1981 | German, Jr. | 375/1 |
| 4,392,220 | 7/1983 | Hirosaki et al. | 370/18 |
| 4,470,138 | 9/1984 | Gutleber | 370/18 |
| 4,475,214 | 10/1984 | Gutleber | 370/18 X |
| 4,475,215 | 10/1984 | Gutleber | 370/18 X |
| 4,494,238 | 1/1985 | Groth, Jr. | 375/1 |
| 4,759,034 | 7/1988 | Nagazumi | 375/1 |
| 5,093,840 | 3/1992 | Schilling | 375/1 |
| 5,103,459 | 4/1992 | Gilhousen et al. | 375/1 |
| 5,218,619 | 6/1993 | Dent | 375/1 |
| 5,291,515 | 3/1994 | Uchida et al. | 375/1 |
| 5,309,474 | 5/1994 | Gilhousen et al. | 375/1 |

FOREIGN PATENT DOCUMENTS

| | | | |
|---|---|---|---|
| 0219085 | 10/1986 | European Pat. Off. | H04Q 11/00 |
| WO92/00639 | 1/1992 | WIPO | H04L 27/30 |

OTHER PUBLICATIONS

Patent Abstracts of Japan, vol. 15, No. 161 (E–1060), Apr. 23, 1991 & JP–A–30 032241 (Mitsubishi Electric Corp.), Feb. 12, 1991.

*Primary Examiner*—Bernarr E. Gregory
*Attorney, Agent, or Firm*—Frishauf, Holtz, Goodman, Langer & Chick

[57]          ABSTRACT

A spreading process is performed with a spreading code assigned to each user and a spreading code assigned according to an attribute, and the resultant signal is modulated on the transmitter side. On the receiver side, a transmitted signal, modulated in the above manner, is subjected to a despreading process with the attribute-oriented spreading code from a reception spreading code generator, the resultant signal is subjected to despreading process with the user-specific spreading code from the reception spreading code generator, and those signals which have undergone the despreading processes are demodulated by data demodulators to extract desired information together with a desired signal corresponding to a wide band service. It is therefore possible to simplify the management of the individual users and individual services and facilitate the system design.

27 Claims, 9 Drawing Sheets

SPREAD SPECTRUM COMMUNICATION SYSTEM

BACKGROUND OF THE INVENTION

1. Field of the Invention

The present invention relates to a spread spectrum communication system and, more particularly, to a spread spectrum communication system which uses communication signals modulated based on the spread spectrum.

2. Description of the Related Art

A spread spectrum communication system permits a plurality of users to perform communication while sharing one wide frequency band on a time and spatial basis, has a large system capacity per bandwidth and is resistive to interference. Thus, such communication system is receiving attention as a solution to the existing excessive concentration of electric waves. In such a spreading spectrum communication system, a specific spreading code is assigned to each user to discriminate signals for that user and spread spectrum is carried out by using the spreading code on the transmitter side. Inverse spread spectrum (despreading) is conducted on the receiver side by using a copy of the spreading code used in the spreading spectrum.

Figure 1:
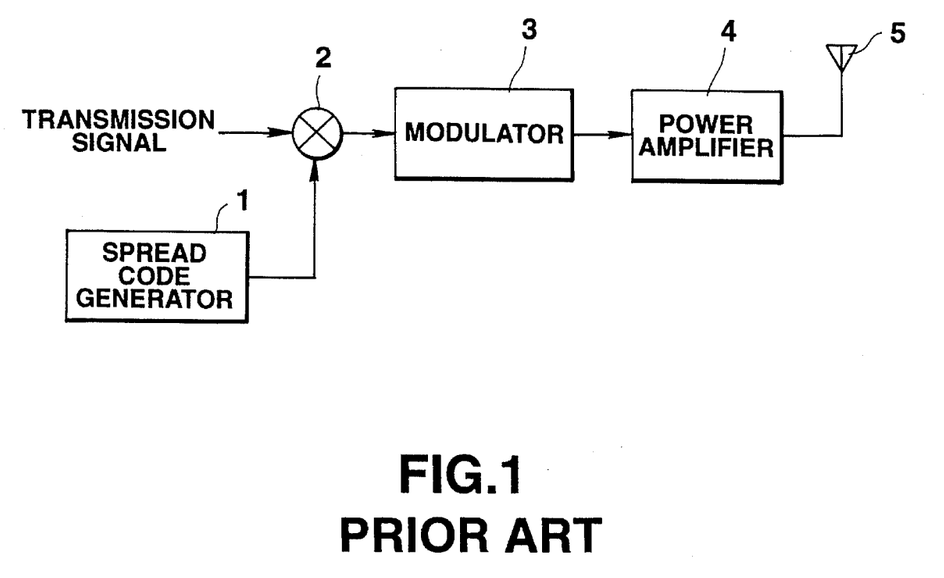
FIG. 1 is a diagram schematically showing the structure of a modulating circuit on the transmitter side of a conventional spread spectrum communication system.

FIG. 1 shows an example of a modulating circuit on the transmitter side in the spread spectrum communication system. A transmission signal and a spreading code, which is specific to the user who uses a concerned terminal and generated from a spread code generator 1, are supplied to a mixer 2. The mixer 2 performs a spreading process on the transmission signal using the spreading code, and sends the resultant signal to a modulator 3. The modulator 3 executes spread-modulation to produce a carrier frequency signal and sends it to a power amplifier 4. The power amplifier 4 amplifies the carrier frequency signal to a proper level and sends the amplified signal to an antenna 5.

Figure 2:
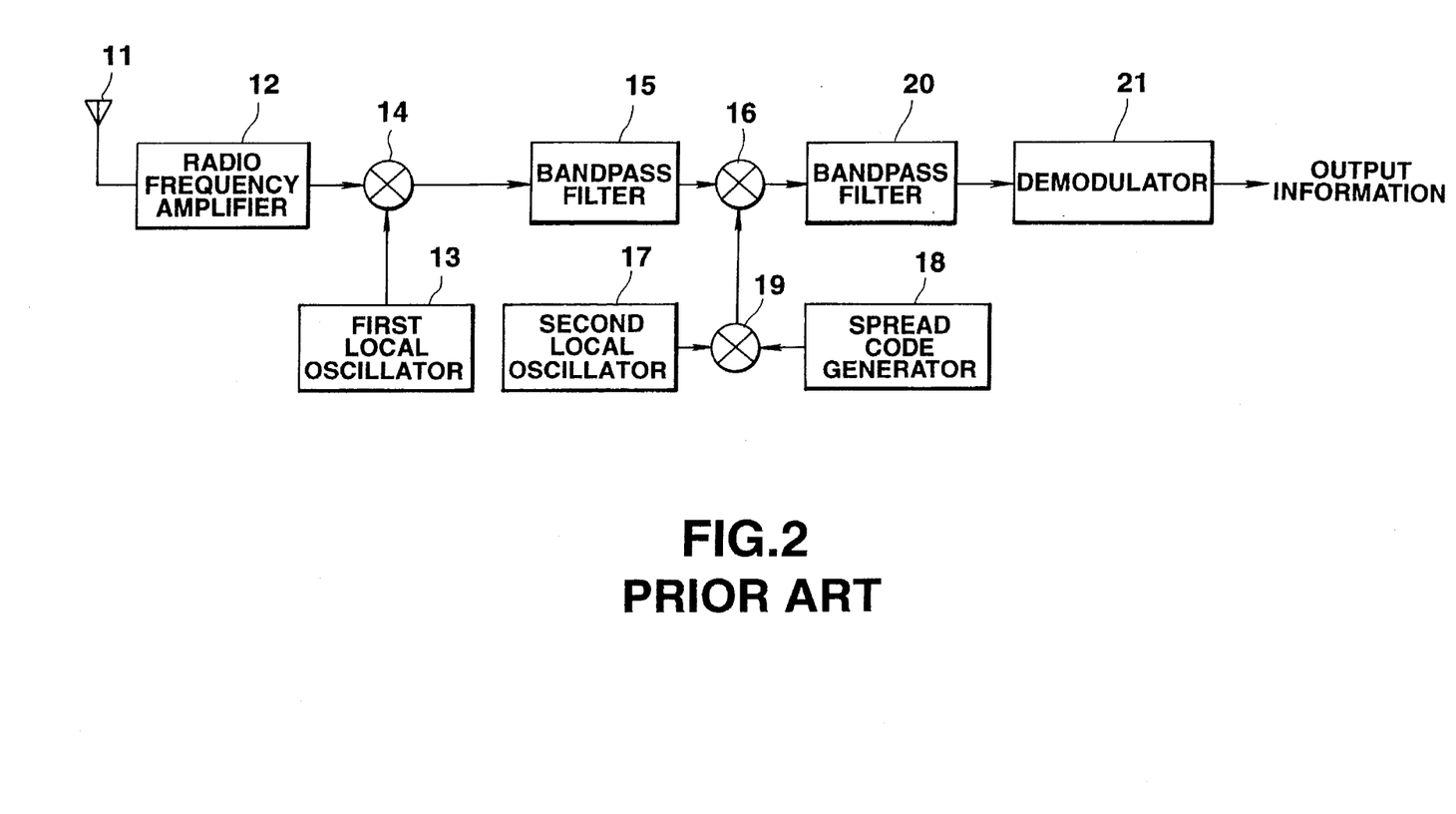
FIG. 2 is a diagram schematically showing the structure of a demodulating circuit on the receiver side of the conventional spread spectrum communication system.

FIG. 2 shows an example of a demodulating circuit on the receiver side in this spread spectrum communication system. A carrier frequency signal, which is received by an antenna 11 and amplified by a radio frequency amplifier 12, and a local oscillation signal output from a first local oscillator 13 are supplied to a first mixer 14 which mixes both signals to produce a first intermediate frequency signal. The first intermediate frequency signal is put through a first bandpass filter 15 to become a first intermediate frequency signal of the desired band. This first intermediate frequency signal is sent to a second mixer 16. The second mixer 16 also receives a local spread signal that is obtained by mixing a local oscillation signal output from a second local oscillator 17 and a spreading code output from a spreading code generator 18, which specifies the receiving user, by a local mixer 19. The second mixer 16 performs a mixing process (despreading) on the first intermediate frequency signal and the spread signal to produce a desired narrow band signal (second intermediate frequency signal). This second intermediate frequency signal is sent to a second bandpass filter 20 to eliminate the unnecessary signal component, yielding a desired signal. The desired signal is then sent to a demodulator 21, which demodulates the desired signal to extract desired information by means of a conventional scheme (digital demodulation or analog demodulation such as FM demodulation).

To properly carry out communication between the transmitter and the receiver, this spread spectrum communication system requires that the spreading code set on the transmitter side should coincide with the spreading code set on the receiver side, and that, in addition, those spreading codes should differ from those for the other channel users who also use this communication system. Besides, in the spread spectrum communication system, a spreading code which is used in wide band services such as image transmission, high speed data transmission etc. has a longer code period than that of a spreading code which is used in narrow band services such as voice transmission, low speed data transmission, etc.

In the spread spectrum communication system, individual services need their spreading codes assigned uniquely to individual users. Even for the transmission of signals of different bandwidths, the spreading codes are also specific to the individual users. If the number of users and/or the number of services is increased, the managing system for the users and services which are managed together as well as the management of those spreading codes becomes complicated. Thus, the system design becomes complex as a consequence.

SUMMARY OF THE INVENTION

It is therefore an object of the present invention to provide a spread spectrum communication system which can simplify the management of users and services and which can be designed easily.

According to an aspect of the present invention, there is provided a spread spectrum communication system comprising a transmission station having first spreading code output means for outputting a first spreading code assigned to each user, second spreading code output means for outputting a second spreading code assigned according to an attribute, spread processing means for performing a spreading process of an information signal with the first and second spreading codes, and transmission means for transmitting a signal processed through the spreading process by the spread processing means; and a receiving station having inverse (despreading) processing means for performing an inverse (despreading) process on a signal transmitted from the transmission station with the second spreading code and performing an inverse despreading process with the first spreading code on a signal obtained through the inverse spreading with the second (despreading) code, and demodulation means for demodulating the signals processed through the inverse (despreading) processes by the inverse (despreading) processing means.

According to another aspect of the present invention, there is provided a spread spectrum communication system comprising a transmission station having first spreading code output means for outputting a first spreading code assigned to each user, second spreading code output means for outputting a second spreading code assigned according to an attribute, spread processing means for performing a spreading process of an information signal with the first and second spreading codes, and transmission means for transmitting a signal processed through the spreading process by the spread processing means.

According to still another aspect of the present invention, there is provided a spread spectrum communication system comprising a receiving section having inverse (despreading) processing means for performing an inverse (despreading) process on a signal transmitted from the transmission station with the second spreading code and performing an inverse (despreading) process with the first spreading code on a signal obtained through the inverse (despreading) with the second spreading code, and demodulation means for demodulating the signals processed through the inverse (despreading) processes by the inverse (despreading) processing means.

In the present invention, the transmitter side performs a spreading process of an information signal with the first spreading code assigned to each user and the second spreading code assigned in accordance with an attribute, and transmits the signal obtained through the spreading process. The receiver side performs an inverse (despreading) process on a transmitted signal with the second spreading code, performs an inverse (despreading) process on the resultant signal obtained through the inverse (despreading) process with the second spreading code, and demodulates those signals which have undergone the inverse (despreading) processes. This system can allow each user to receive the desired service according to the first and second spreading codes, and can separately manage the spreading code according to the attribute of each service and the spreading code according to each user.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS PRINCIPLE OF THE INVENTION

First, the concept of the present invention will be described.

In a spread spectrum communication system, the number of allowable users M, a process gain PG, the ratio of a desired signal and an undesired signal after an spreading inverse (despreading) process D/U, the ratio of an input desired signal and an undesired signal (before the despreading process) C/N, and reception power P of respective signals have the relationships given by the following equations (1) and (2). In this case, the number of users which can be accommodated in the system is maximum when signals sent from respective users have an equal reception power P, and such conditions are assumed.

$$(D/U)=PG\cdot(C/N) \quad (1)$$

$$(C/N)=P/(P\cdot(M-1)) \quad (2)$$

(D/U) can be expressed from the above equations (1) and (2) as follows:

$$(D/U)=PG/(M-1) \quad (3)$$

Therefore, the number of users of the system can be obtained as follows:

$$M=1+PG/(D/U) \quad (4)$$

For example, the number of allowable users which can be use the system will be considered in the following manner where numerical examples are specifically determined as follows:

a spread bandwidth is 10 MHz;

a band for a narrow band service is 5 KHz;

a band for an intermediate band service is 25 KHz;

a band for a wide band service is 500 KHz;

(D/U) required for narrow and intermediate band services is 7.8 dB ($\approx$log 6); and (D/U) required for a wide band service is 4.8 dB ($\approx$log 3).

When the spread bandwidth 10 MHz is assigned only to the narrow band service, the processing gain PG is 2000 (=10 MHz/5 KHz) and the number of users thereof is 334 ($\approx$1+400/6). When the spread bandwidth 10 MHz is assigned only to the wide band service, the processing gain PG is 20 (=10 MHz/500 KHz) and the number of users thereof is 7 ($\approx$1+20/3).

In the present invention, for example, the bandwidth 500 KHz of the wide band service stated above is assigned to the narrow band service or the intermediate band service, and the channels (the number of channels=the number of users) of the wide band service are used as a measure for classifying the attributes of services or the like.

When the bandwidth 500 KHz of the wide band service stated above is assigned to the narrow band service, the processing gain PG is 100 (=500 KHz/5 KHz), and therefore, the number of users thereof is 17 (=1+100/6). In addition, when the bandwidth 500 KHz of the wide band service stated above is assigned to the intermediate band service, the processing gain GP is 20 (=500 KHz/25 KHz), and therefore, the number of users is 4 (=1+20/6).

It is assumed that the wide band service is used as a measure for classifying the attributes of services, one of the number of users, 7, can be used as a signal to transfer various kinds of control information and information such as notice information while the remaining six can be used as a signal to constitute the attributes of six groups.

If the attributes of those six groups are all assigned to the narrow band services, 17 users for each of six groups constitute a total of 102 users for the narrow band services.

If the attributes of a half of the six groups are assigned to the intermediate band services and the attributes of the remaining three groups are assigned to the narrow band services, 4 users for each of three groups constitute a total of 12 users for the intermediate band services and 17 users for each of three groups constitute a total of 51 users for the narrowband services.

With this structure, therefore, each user can receive the desired service by setting a spreading code for discriminating each user and selecting one of six kinds of spreading codes that indicates the attribute of the desired service.

In other words, spreading codes are assigned user by user in the conventional spread spectrum communication system, whereas the present invention forms hierarchical spread bands corresponding to spreading codes in spread spectrum communication, specifically assigns first spreading codes to individual users who share the same attribute, such as the same service, and assigns a second spreading code to the attribute of a common service, so that various kinds of services can be determined by the bandwidths of information to be transmitted. For instance, a high speed data transmission and an image transmission are assigned as the wide band services, a data transmission and a facsimile transmission are assigned as the intermediate band services, and a voice transmission and a low speed transmission are assigned as the narrow band services. Other attribute classification schemes may include grouping by users in a common organization and grouping by users who share a place.

FIRST EMBODIMENT

Figure 3:
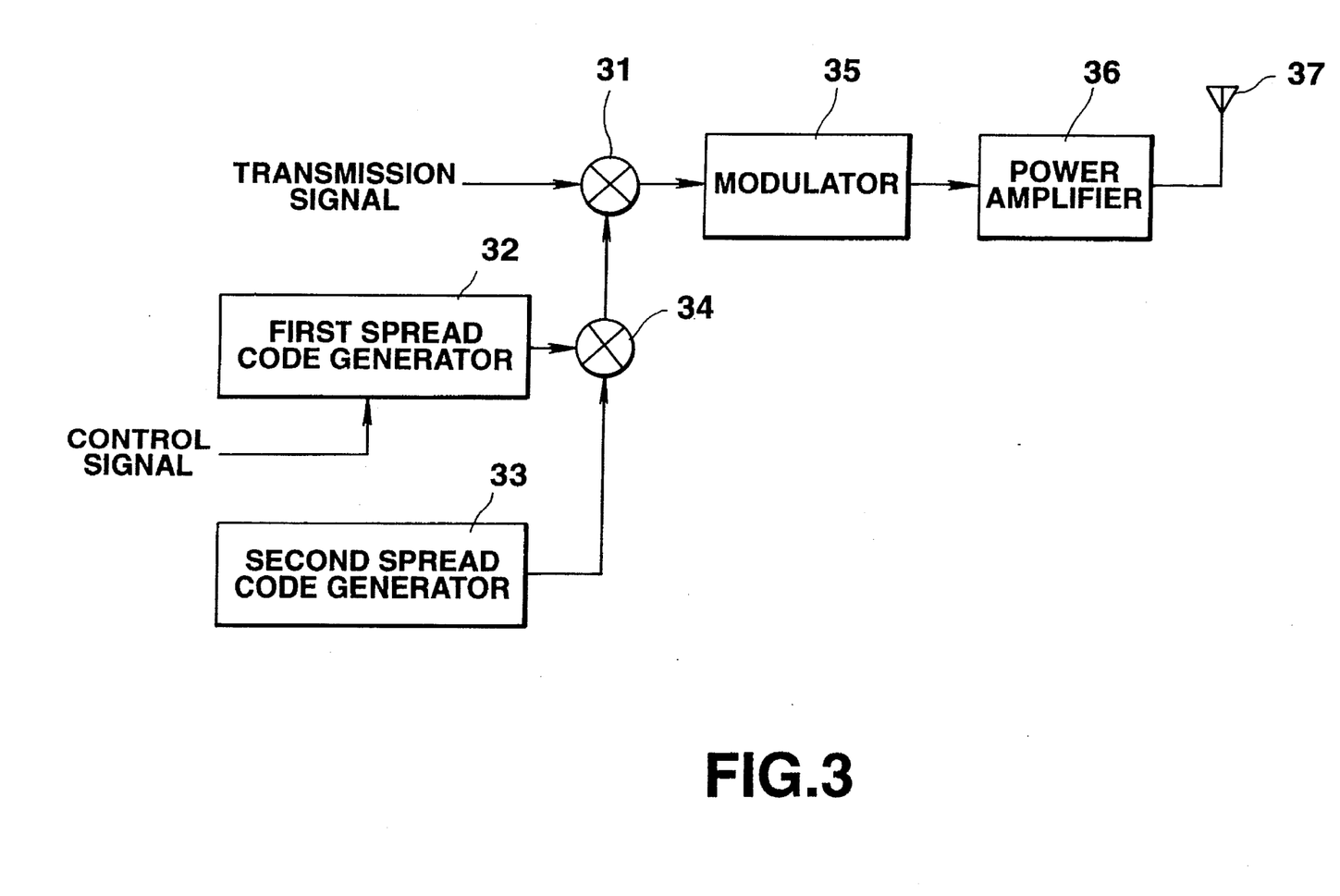
FIG. 3 is a diagram schematically showing the structure of a modulating circuit on the transmitter side according to one embodiment of the present invention.
Figure 4:
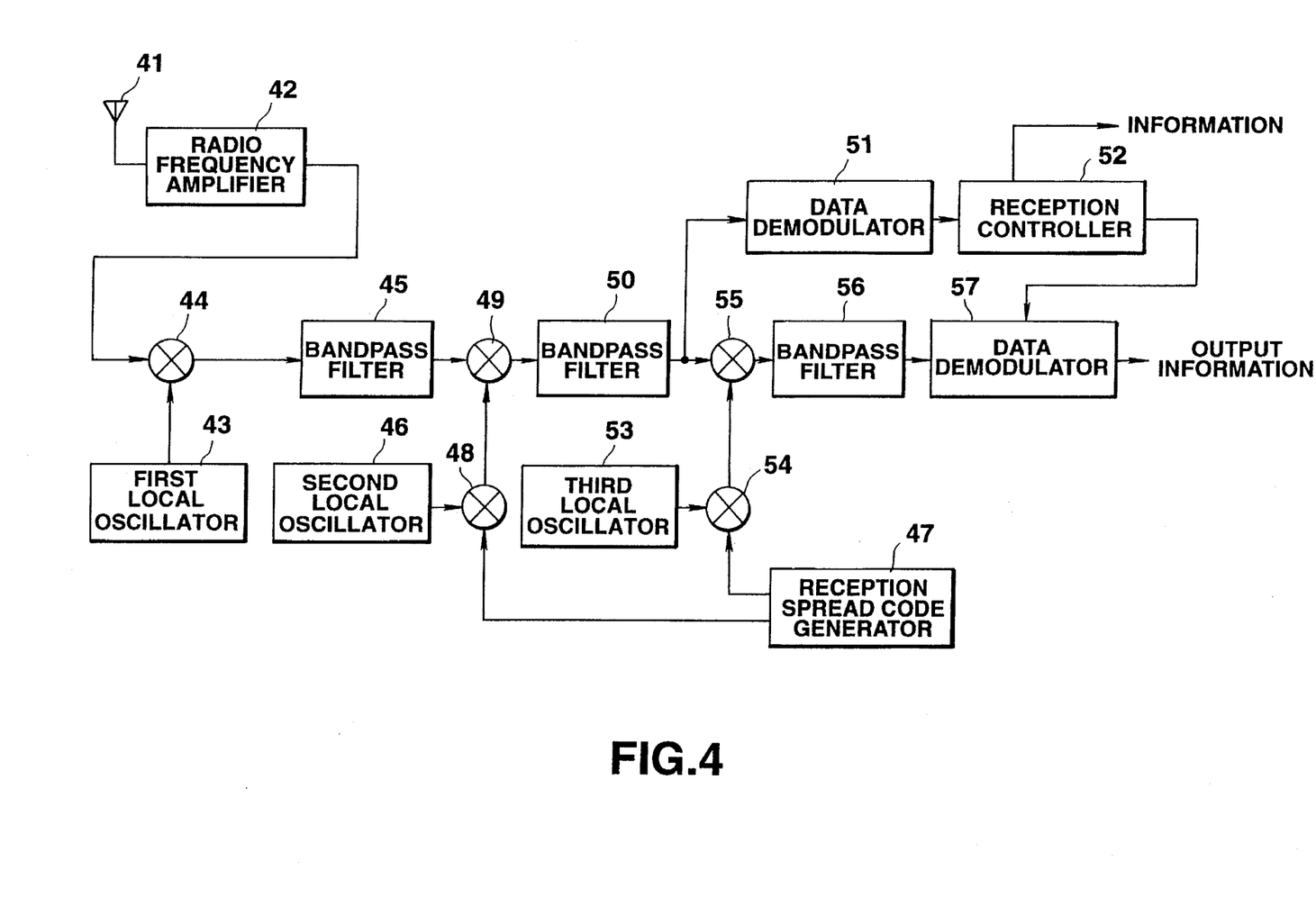
FIG. 4 is a diagram schematically showing the structure of a demodulating circuit on the receiver side according to one embodiment of the present invention.

FIGS. 3 and 4 illustrate schematic structures which specifically accomplish the above-described concept of the present invention.

FIG. 3 shows a modulating circuit on the transmitters side of a spread spectrum communication system according to the first embodiment. The modulating circuit comprises a mixer 31, a first spreading code generator 32, a second spreading code generator 33, a mixer 34, a modulator 35, a power amplifier 36 and an antenna 37. In the modulating circuit on the transmitter side shown in FIG. 3, when a transmission signal (information signal) is supplied to the mixer 31, a spreading process is performed based on a spread code, which is supplied from the mixer 34. The resultant signal is subjected to spreading modulation in the modulator 35, producing a carrier frequency signal. The carrier frequency signal is amplified to a proper level by the power amplifier 36 and the amplified signal is then sent to an antenna 37. In this case, the spreading code supplied to the mixer 31 is what is obtained by mixing a spreading code from the first spreading code generator 32, which produces spreading codes specific to individual users, with a spreading code output from the second spreading code generator 33, which produces spreading codes assigned according to the attributes, so that the service desired by each user is assigned. The mixer 34 may also be comprise a modulo-2 adder.

The bit rate (or chip rate) of spreading codes specific to users outputted from the first spreading code generator 32 should preferably be equal to a value obtained by multiplying the bit rate of information signals by an integer. In addition, the bit rate of the attribute-oriented spreading codes outputted from the second spread code generator 33 should preferably be equal to a value obtained by multiplying the bit rate of spreading codes specific to users by an integer. For example, when the spread bandwidth is set to 10 MHz, as has been described above, and the band is used as a measure for classifying attributes, the bit rate of the spreading codes specific to users is 500 Kbps (500 KHz) and the bit rate of the attribute-oriented spreading codes is 10 Mbps (10 MHz). In this setting, the services which users can receive are services of narrow band data in which information signals have a bit rate of 5 Kbps (5 KHz) or services of intermediate band data in which information signals have a bit rate of 25 Kbps (25 KHz). In addition, when control information or notice information is transmitted, the bit rate of such information is 500 Kbps (500 KHz) and therefore, control is performed such that spreading codes are not generated from the first spreading code generator 32.

FIG. 4 shows a demodulating circuit on the receiver side of the spread spectrum communication system according to the first embodiment. The demodulating circuit comprises an antenna 41, a radio frequency amplifier 42, a first local oscillator 43, a mixer 44, a first bandpass filter 45, a second local oscillator 46, a reception spreading code generator 47, mixers 48 and 49, a second bandpass filter 50, a data demodulator 51, a reception controller 52, a third local oscillator 53, mixers 54 and 55, a third bandpass filter 56, and a data demodulator 57. In the demodulating circuit on the receiver side shown in FIG. 4, when a carrier frequency signal is received at an antenna 41, this carrier frequency signal is amplified by the RF amplifier 42 and then sent to the first mixer 44 to be mixed with a local oscillation signal from the first local oscillator 43, outputting a first intermediate frequency signal. The first intermediate frequency signal is put through the first bandpass filter 45 to become a first intermediate frequency signal of the desired band. The reception spreading code generator 47 outputs an attribute-oriented spread code corresponding to the attribute of the service that is needed by the receiving user. This attribute-oriented spreading code is supplied to the mixer 48 to be mixed with a local oscillation signal from the second local oscillator 46. The resultant signal is supplied to the mixer 49 to be mixed with the first intermediate frequency signal provided by the first bandpass filter 45, producing an inversely-spread (a despread) second intermediate frequency signal. This second intermediate frequency signal is put through the second bandpass filter 50 to become a second intermediate frequency signal of the desired band. This second intermediate frequency signal is the desired signal that has been filtered in accordance with a wide band data service. The second intermediate frequency signal corresponding to the wide band data service is supplied to the data demodulator 51. If this second intermediate frequency signal is a signal corresponding to the control signal or information, it is demodulated by the data demodulator 51 and output to the reception controller 52. The reception controller 52 judges contents of information transmitted from the data demodulator 51. If the information is judged as a control information to control the data demodulator 57, as described later, then the reception controller 52 controls the data demodulator 57 based on the content of the information. If the information is determined as information such as notice information, then the reception controller 52 outputs such information to relevant circuits (not shown).

For an intermediate band data service or a narrow band data service, the second intermediate frequency signal is further processed.

In this case, the second intermediate frequency signal is supplied to the mixer 55. Under this circumstance, the reception spreading code generator 47 outputs a user-specific spreading code. This user-specific spreading code is supplied to the mixer 54 to be mixed with a local oscillation signal from the third local oscillator 53. The resultant signal is supplied to the mixer 55 to be mixed with the second intermediate frequency signal provided by the second bandpass filter 50, outputting a despread third intermediate frequency signal of the desired narrow band. This third intermediate frequency signal is supplied to the third bandpass filter 56 to eliminate the unnecessary signal component. The resultant signal is sent as a desired signal to the data demodulator 57. Under the control of the reception controller 52, the data demodulator 57 demodulates the desired signal according to the conventional demodulation scheme (digital demodulation or analog demodulation such as FM demodulation) to extract desired information. To properly carry out communication between the transmitter and the receiver, it is needless to say that the spreading code set on the transmitter side should coincide with the spreading code set on the receiver side, and that those spreading codes should differ from those for the other channel users who also use this communication system.

According to the first embodiment, when a user wants to receive the desired service, the first spreading code specific to the user and the second spreading code assigned to the service attribute are selected and spread processing is performed with those spreading codes in the modulating circuit on the transmitter side, while a signal obtained through a despreading process with the second spreading code is demodulated to discriminate the service attribute and a signal obtained by performing a despreading process on the signal, despread with the second spreading code, with the first spreading code is demodulated to extract a desired information signal. The user can therefore receive the service according to the first and second spreading codes. As the spreading code according to the attribute of each service and the spreading code according to each user can separately be managed, the management of the individual users and individual services can be simplified and the system design can become easier.

If the high speed data transmission and the image transmission are assigned as the wide band services, the data transmission and the facsimile transmission are assigned as the intermediate band services, and the voice transmission and the low speed transmission are assigned as the narrow band services, those services can be used effectively as desired by each user.

Although the demodulating circuit on the receiver side has a more complex structure than that of the conventional demodulating circuit, the output of the bandpass filter 50 has a frequency of as high as 500 KHz, which can be handled sufficiently by the existing digital signal processing technology. Further, since the demodulating circuit can be designed as a digital circuit, the somewhat complex structure does not stand in the way of achieving the present invention.

Figure 5:
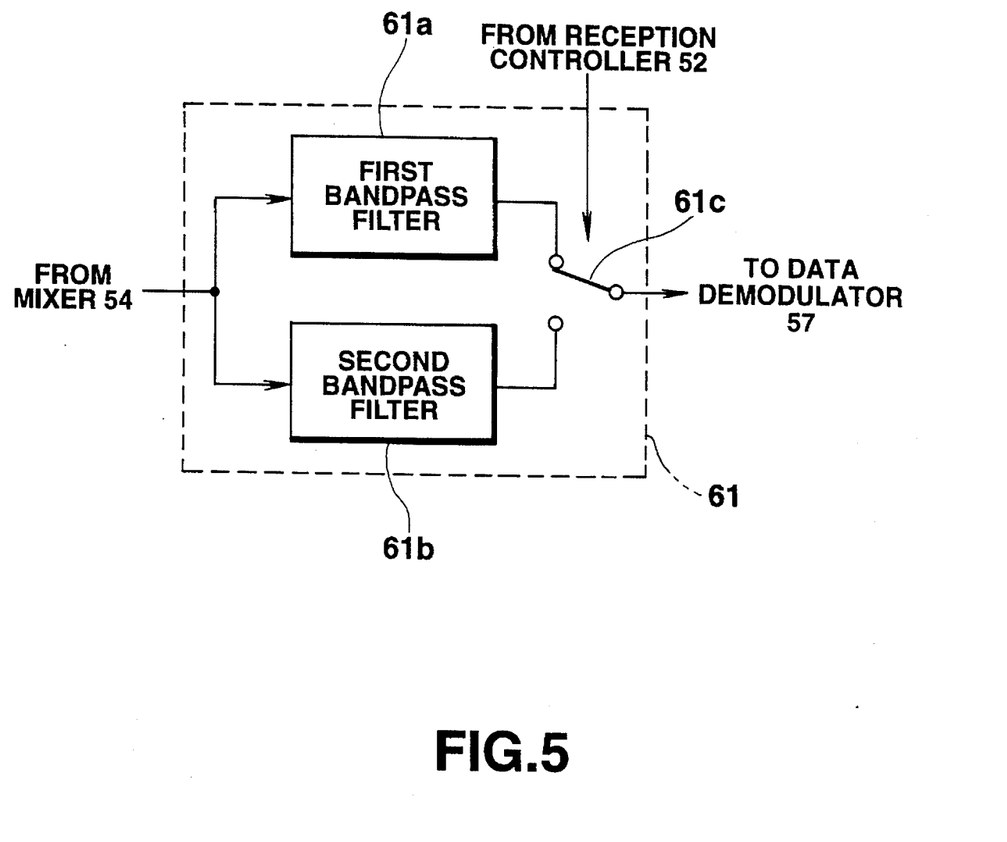
FIG. 5 is a diagram schematically showing the structure of a filter circuit which can be used in the demodulating circuit in FIG. 4.

FIG. 5 shows a filter circuit which can be used in the demodulating circuit in FIG. 4. For example, a demodulating circuit may be arranged so as to replace the bandpass filter 56 shown in FIG. 4 with the filter circuit 61 in FIG. 5. The filter circuit 61 can selectively use one of the first bandpass filter 61a for narrow band data and the second bandpass filter 61b for intermediate band data, by switching the switch circuit 61c. The switching control of the switching circuit 61c can be carried out by the reception controller 52 in FIG. 4. If the demodulating circuit is arranged as stated above, data transmitted from the transmitter side can be securely received and demodulated at the receiver side if, prior to data transmission, only either information notifying the receiver side of whether narrow band data or intermediate band data is to be transmitted as data, or control information indicating which one of bandpass filters 61a and 61b is to be selected is transmitted from the transmitter side. Specifically, in the demodulating circuit having the arrangement as stated above, the reception controller 52 decides the contents of the above-mentioned information or control information transmitted prior to data transmission, and controls the switch circuit 61c on the basis of the decision results, thereby to select one of the bandpass filters 61a and 61b. Therefore, data transmitted from the transmitter side can be securely received and demodulated.

Figure 6:
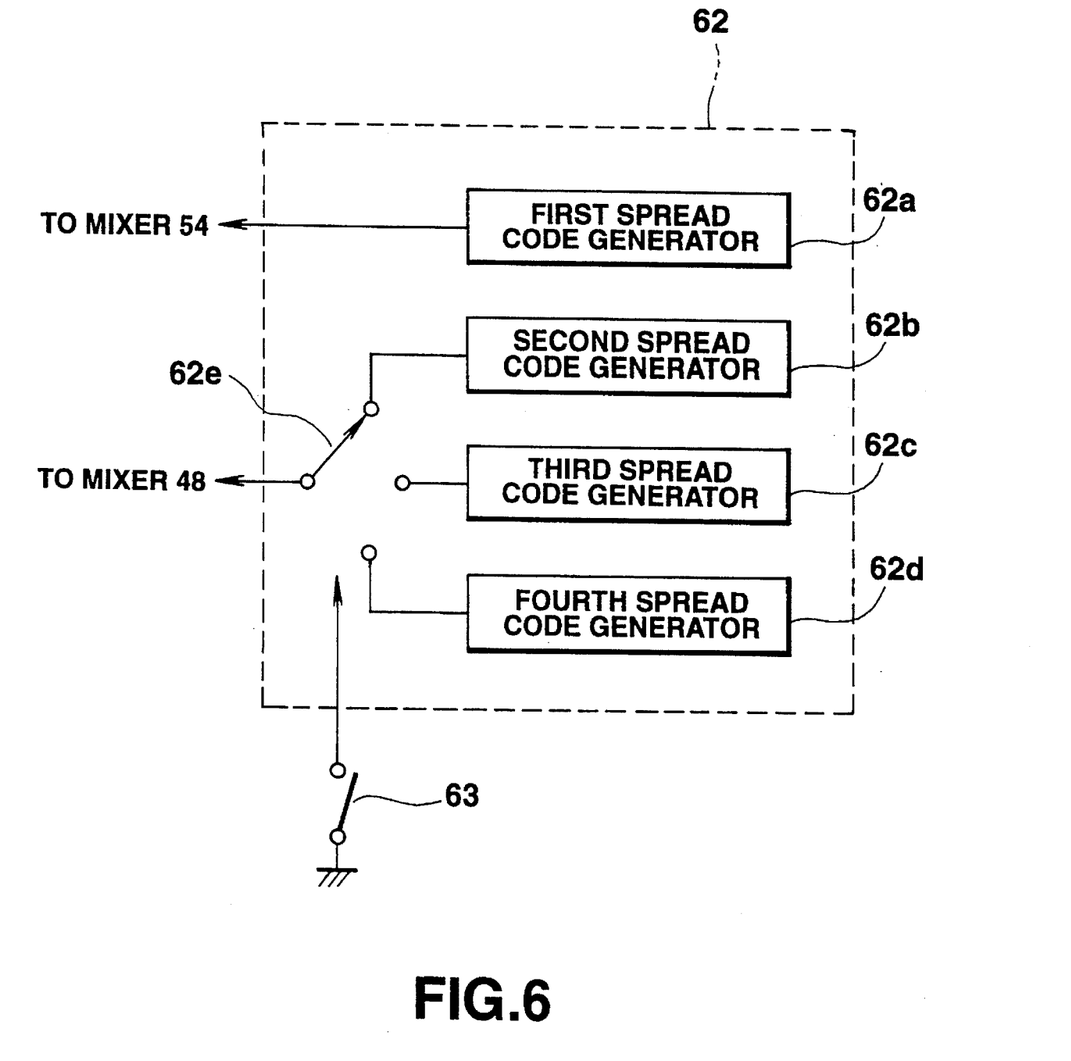
FIG. 6 is a diagram schematically showing the structure of a spreading code generator which can be used in the demodulating circuit in FIG. 4.

FIG. 6 shows a spreading code generator which also can be used in the demodulating circuit in FIG. 4. In addition, the demodulating circuit may be arranged such that the reception spreading code generator 47 in FIG. 4 is substituted with the spreading code generator 62 shown in FIG. 6. The spreading code generator 62 shown in FIG. 6 comprises a first spreading code generator 62a for generating spreading codes specific to users, second to fourth spreading code generators 62b to 62d for respectively generating different attribute-oriented spreading codes, and a switching circuit 62e for selecting one of the second to fourth spreading code generators 62b to 62d in accordance with an operation of an external manual switch 63. By replacing this spreading code generator 62 with the reception spreading code generator 47 shown in FIG. 4, a spreading code specific to a user which is generated by the first spreading code generator 62a is directly outputted to the mixer 54 shown in FIG. 4, and an attribute-oriented spreading code generated by one of the second to fourth spreading code generators 62b to 62d selected in accordance with the external manual switch 63 is outputted to the mixer 48 through the switching circuit 62e.

Figure 7:
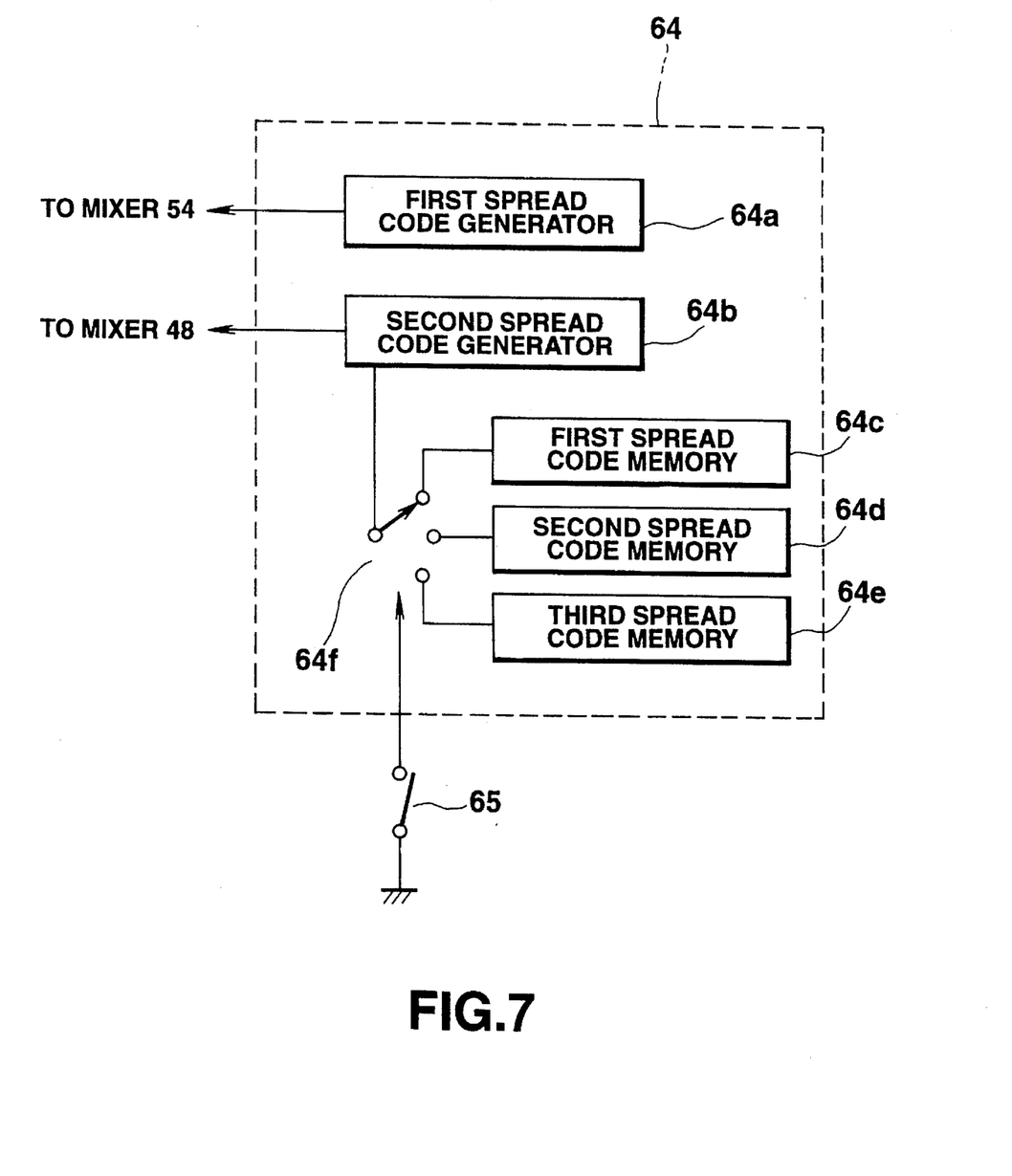
FIG. 7 is a diagram schematically showing the structure of another spreading code generator which also can be used in the demodulating circuit in FIG. 4.

FIG. 7 shows another spreading code generator which also can be used in the demodulating circuit in FIG. 4. The spreading code generator 64 shown in FIG. 7 comprises a first spreading code generator 64a for generating spreading codes specific to users, a second spreading code generator 64b for generating attribute-oriented spreading codes, first to third spreading code memories 64c to 64e for respectively storing different attribute spreading codes, and a switching circuit 64f for connecting one of the first to third spreading code memories 64c to 64e to the second spreading code generator 64b according to the operation of an external manual switch 65. By replacing the spreading code generator 64 with the reception spreading code generator 47 shown in FIG. 4, a spreading code specific to each user which is generated by the first spreading code generator 64a is directly outputted to the mixer 54 shown in FIG. 4, whereas an attribute-oriented spreading code generated by the second spreading code generator 64b, i.e., an attribute-oriented spreading code stored in one of the first to third spreading code memories 64c to 64e which is connected to the second spreading code generator 64b through the switching circuit 64f is outputted to the mixer 48 shown in FIG. 4. When the demodulating circuit is arranged as stated above, attribute-oriented codes to be supplied to the mixer 48 of FIG. 4 can be switched by operating the manual switch 63 or 65. Therefore, when a plurality of transmission stations are broadcasting different information programs, it is possible for the user to select and receive any of these programs.

Figure 8:
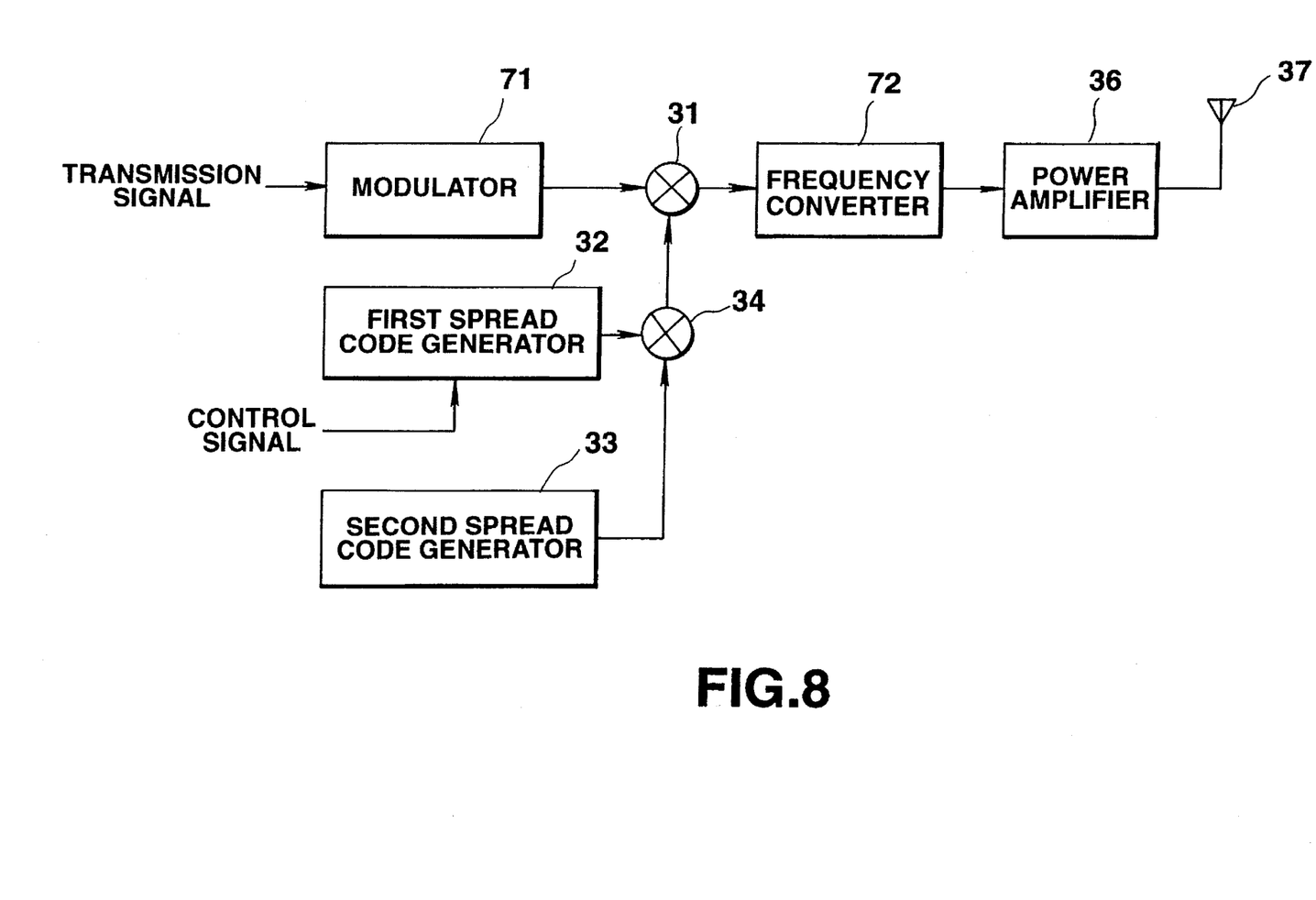
FIG. 8 is a diagram schematically showing the structure of another modulating circuit on the transmitter side.

FIG. 8 shows a structure of another modulating circuit on the transmitter side. Further, the modulating circuit in FIG. 3 may be arranged as shown in FIG. 8. The modulating circuit shown in FIG. 8 is arranged so as to separately perform the information modulation and the spreading modulation which are carried out at the same time in the modulator 35 shown in FIG. 3. Specifically, in the modulating circuit shown in FIG. 8, first a modulator 71 modulates a carrier signal having an appropriate frequency by a transmission signal e.g., digital data or an analogue signal using e.g., a digital modulation scheme such as PSK or an analogue modulation scheme such as an FM modulation. A frequency converter 72 converts the frequency into a carrier frequency. The carrier frequency signal thus subjected to a frequency modulation is the same as a carrier frequency signal outputted from the modulator 35 in the modulating circuit shown in FIG. 3, is amplified to an appropriate level by the power amplifier 36, and is thereafter sent to the antenna 37.

Although it has not been clearly described in the above explanation of specific embodiments, it is needless to say that each of stations of the transmitter side and receiver side may comprise both of a transmission circuit (modulator) and a reception circuit (demodulator).

SECOND EMBODIMENT

Figure 9:
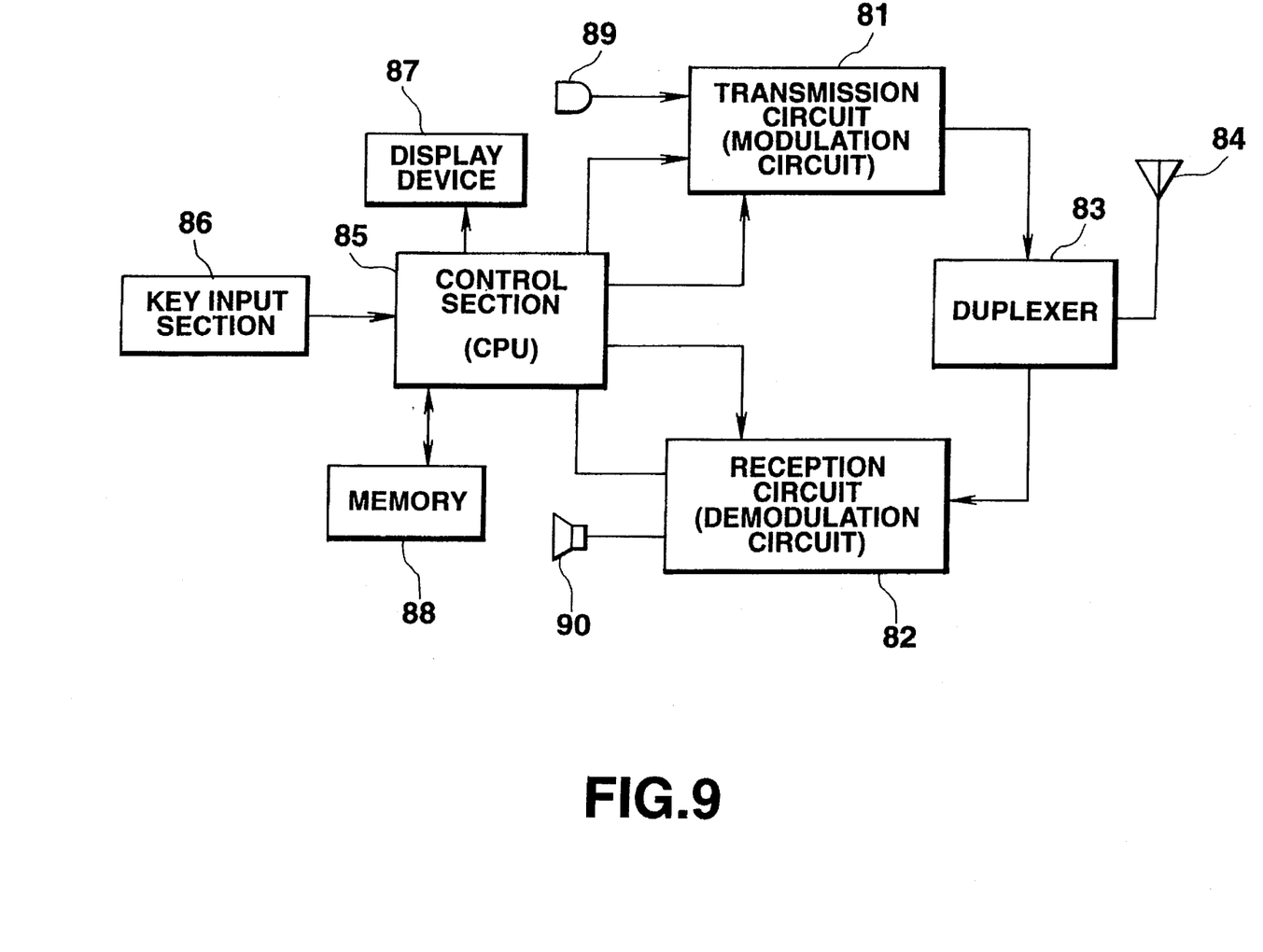
FIG. 9 is a diagram schematically showing the structure of another embodiment of a communication system of the present invention which comprises both a transmission circuit and a reception circuit.

FIG. 9 shows another embodiment of a communication system according to the second embodiment comprising a transmission circuit and a reception circuit. In FIG. 9, a transmission circuit (modulation circuit) 81 corresponds to the modulation circuit shown in FIG. 3 and FIG. 8 and a reception circuit (demodulation circuit) 82 corresponds to the demodulation circuit shown in FIG. 4. The transmission circuit 81 and the reception circuit 82 are connected to a single antenna 84 through a duplexer 83. A control section 85 comprises of a CPU, for example. The control section 85 is connected to a key input section 86, a display device 87, and a memory 88, in addition to both of the transmission and reception circuits 81 and 82 stated above. The control section 85 performs various controls, e.g., a first control for displaying data inputted from the key input section 86 or information (i.e., data, notice information or the like) received by the reception circuit 82 onto the display device 87 and storing the data or information into the memory 88; a second control for transmitting data inputted from the key input section 86 or data read out from the memory 88 to the transmission circuit 81, as transmission data (i.e., transmission signals) and outputting the transmission data through the transmission circuit 81; a third control for outputting audio signals inputted from a microphone 89 as transmission signals through the transmission circuit 81; and a fourth control for outputting audio signals received by the reception circuit 82 to a loud speaker 90.

As described above, the transmitter side performs a spreading process with the first spreading code assigned to each user and the second spreading code assigned in accordance with an attribute, and modulates the signal obtained through the spreading process. The receiver side performs a despreading process on a transmitted signal with the second spreading code, performs a despreading process on the resultant signal obtained through the despreading process with the second spreading code, and demodulates those signals which have undergone the despreading processes. This system can allow each user to receive the desired service according to the first and second spreading codes and can separately manage the spreading code according to the attribute of each service and the spreading code according to each user. It is therefore possible to simplify the management of the individual users and individual services and facilitate the system design.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A spread spectrum communication system comprising:
a transmission station having:
first spreading code output means for outputting a first spreading code assigned to each user of the communication system, said first spreading code being a personal code different from other spreading codes,
second spreading code output means for outputting a second spreading code assigned according to a service attribute of the communication system,
spreading means for spreading an information signal with said first and second spreading codes, and
transmission means for transmitting said information signal spread by said spreading means; and
a receiving station having:
first despreading means for despreading said information signal transmitted from said transmission station with said second spreading code,
second despreading means for despreading said information signal despread by said first despreading means with said first spreading code, and
demodulation means for demodulating said signals despread by said second despreading means.

2. A spread spectrum communication system according to claim 1, wherein said service attribute of the communication system corresponds to a frequency bandwidth required by each user of the communication system.

3. A spread spectrum communication system according to claim 1, wherein said second spreading code has a chip rate which is higher than that of said first spreading code.

4. A spread spectrum communication system according to claim 1, wherein said second spreading code has a chip rate which is an integral multiple of that of said first spreading code.

5. A spread spectrum communication system according to claim 1, wherein said first spreading code has a chip rate which is an integral multiple of bit rate of said information signal.

6. A spread spectrum communication system according to claim 1, wherein said transmission station further includes means for transmitting notifying information having a bit rate which is identical to a chip rate of said first spreading code under a condition wherein said first spreading code is inhibited to be output.

7. A spread spectrum communication system according to claim 1, wherein said receiving station further includes means for selecting a bandpass filter of a plurality of bandpass filters based on a notifying signal transmitted by said transmitting station before transmission of said information signal.

8. A spread spectrum communication system according to claim 1, wherein said receiving station further includes means for outputting selectively plural kinds of said second spreading codes, and despreads said information signal transmitted from said transmitting station based on a second spreading codes output from said outputting means.

9. A spread spectrum communication system according to claim 1, wherein said receiving station further includes means for demodulating said information signal despread by said first despreading means.

10. A spread spectrum communication system according to claim 1, wherein said service attribute is determined such that a certain group of users belonging to respective common organizations can be identified.

11. A spread spectrum communication system according to claim 1, wherein said service attribute identifies a certain group of users placed in respective common locations.

12. A transmission station, for use in a spread spectrum communication system, comprising:
   first spreading code output means for outputting a first spreading code assigned to each user of the communication system, said first spreading code being a personal code different from other spreading codes;
   second spreading code output means for outputting a second spreading code assigned according to a service attribute of the communication system;
   spreading means for spreading an information signal with said first and second spreading codes; and
   transmission means for transmitting said information signal spread by said spreading means.

13. A transmission station according to claim 12, wherein said service attribute of the communication system corresponds to a frequency bandwidth required by each user of the communication system.

14. A transmission station according to claim 13, wherein said service attribute of the communication system corresponds to a frequency bandwidth required by each user of the communication system.

15. A transmission station according to claim 12, wherein said second spreading code has a chip rate which is higher than that of said first spreading code.

16. A transmission station according to claim 12, wherein said second spreading code has a chip rate which is an integral multiple of that of said first spreading code.

17. A transmission station according to claim 12, wherein said first spreading code has a chip rate which is an integral multiple of bit rate of said information signal.

18. A transmission station according to claim 12, wherein said transmission station further includes means for transmitting notifying information having bit rate which is identical to a chip rate of said first spreading code under a condition wherein said first spreading code is inhibited to be output.

19. A receiving station, for use in a spread spectrum communication system, comprising:
   first despreading means for despreading an information signal transmitted from a transmission station with a second spreading code;
   first demodulation means for demodulation said information signal despread by said first despreading means;
   second despreading means for despreading said information signal despread by said first spreading means with a first spreading code; and
   second demodulation means for demodulating said signals despread by said second despreading means.

20. A receiving station according to claim 19, further comprising means for selecting a bandpass filter of a plurality of band pass filters based on a notifying signal transmitted by said transmitting station before transmission of said information signal.

21. A receiving station according to claim 19, further comprising means for selectively outputting plural kinds of second spreading codes, and wherein said first despreading means despreads said information signal transmitted from said transmission station based on a second spreading code output from said outputting means.

22. A spread spectrum communication system comprising:
   a transmission station having:
      first spreading code output means for outputting a first spreading code assigned to each user of the communication system, said first spreading code being a personal code different from other spreading codes,
      second spreading code output means for outputting a second spreading code assigned according to a service attribute of the communication system,
      spreading means for spreading an information signal with at least one of said first and second spreading codes,
      means for inhibiting spreading of said information signal based on said first spreading code, whereby said information signal is spread with only said second spreading code transmission means for transmitting said information signal spread by said spreading means; and
   a receiving station having:
      first despreading means for despreading said information signal transmitted from said transmission station with said second spreading code;
      second despreading means for, when said inhibiting means did not inhibit spreading based on said first spreading code, despreading said information signal despread by said first despreading means with said first spreading code, and
      demodulation means for demodulating said signals despread by said second despreading means.

23. A spread spectrum communication system according to claim 22 wherein said service attribute of the communication system corresponds to a frequency bandwidth required by each user of the communication system.

24. A transmission station, for use in a spread spectrum communication system, comprising:
   first spreading code output means for outputting a first spreading code assigned to each user of the communication system, said first spreading code being a personal code different from other spreading codes;
   second spreading code output means for outputting a second spreading code assigned according to a service attribute of the communication system;
   spreading means for spreading an information signal with at least one of said first and second spreading codes;
   means for inhibiting spreading of said information signal based on said first spreading code, whereby said information signal is spread with only said second spreading code; and
   transmission means for transmitting said information signal spread by said spreading means.

25. A communication method employing two kinds of spreading codes in a spreading spectrum of information signals, the method comprising of the steps of:
   setting one of said two kinds of spreading codes as a user identification spreading code for identifying respective users of the communication system independently, and setting another of said two kinds of spreading codes as a service identification spreading code for identifying a required communication service, a chip rate of said service identification spreading code being set to be an integral multiple of a chip rate of said user identification spreading code;
   spread-modulating said information signals by employing said two kinds of spreading codes in a transmission station, and then transmitting the spread-modulated information signals from said transmission station; and
   first despreading said spread-modulated information signals in a receiving station by employing said service identification spreading code assigned to respective receiving stations, and thereafter despreading despread information signals by employing said user identification spreading code so as to result in said information signals.

26. A communication method employing two kinds of spreading codes in a spreading spectrum of information signals, the method comprising of the steps of:

setting one of said two kinds of spreading codes as a user identification spreading code, a chip rate of said user identification spreading code being set to be an integral multiple of a bit rate of said information signals, for identifying respective users of the communication system independently, and setting another of said two kinds of spreading codes as a service identification spreading code, a chip rate of said service identification spreading code being set to be an integral multiple of a chip rate of said user identification spreading code, said service identification spreading code identifying a kind of required communication service;

spread-modulating said information signals by employing both of said two kinds of spreading codes in a transmission station, and then transmitting the spread-modulated information signals from said transmission station; and first despreading said spread-modulated information signals in a receiving station by employing said service identification spreading code assigned to respective receiving stations, and thereafter despreading the despread information signals by employing said user identification spreading code as to result in said information signals.

27. A communication method for communicating information signals employing a spreading spectrum of said information signals, the method comprising of the steps of:

allocating plural kinds of spreading codes, which are capable of spreading said information signals into identical bandwidths, as service identification spreading codes for respective identifying required attributes of communication services;

assigning user identification spreading codes for identifying respective users independently of said respective users;

spread-modulating said information signals by employing both of said service identification spreading code and said user identification spreading code in a transmission station, and then transmitting the spread-modulated information signals from said transmission station; and despreading said spread-modulated information signals in a receiving station by employing said service identification spreading code assigned to respective receiving stations, and thereafter despreading despread information signals by employing said user identification spreading code so as to result in said information signals.

* * * * *